United States Patent
Winkler et al.

(10) Patent No.: US 11,072,252 B2
(45) Date of Patent: Jul. 27, 2021

(54) CHARGING PORT COVER AND/OR FUEL CAP MODULE FOR A MOTOR VEHICLE

(71) Applicant: VOLKSWAGEN AKTIENGESELLSCHAFT, Wolfsburg (DE)

(72) Inventors: Bernd Winkler, Lehre (DE); Peter Kipke, Bokensdorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 191 days.

(21) Appl. No.: 16/445,318

(22) Filed: Jun. 19, 2019

(65) Prior Publication Data
US 2019/0381905 A1 Dec. 19, 2019

(30) Foreign Application Priority Data
Jun. 19, 2018 (DE) .................. 10 2018 209 848.4

(51) Int. Cl.
*B60L 53/14* (2019.01)
*H01R 13/717* (2006.01)
(Continued)

(52) U.S. Cl.
CPC .............. *B60L 53/14* (2019.02); *B60K 15/05* (2013.01); *B60L 58/12* (2019.02); *B60Q 1/2661* (2013.01);
(Continued)

(58) Field of Classification Search
CPC ..... B60L 53/14; B60L 58/12; H01R 13/7175; H01R 2201/26; H02J 7/0047;
(Continued)

(56) References Cited

U.S. PATENT DOCUMENTS 5,757,595 A * 5/1998 Ozawa et al. .......... B60L 53/16
340/636.1
6,588,270 B1 7/2003 Petzold et al.
(Continued)

FOREIGN PATENT DOCUMENTS

DE 102011114075 A1 6/2012
DE 102011108817 A1 8/2012
(Continued)

*Primary Examiner* — Sun J Lin
(74) *Attorney, Agent, or Firm* — Muncy, Geissler, Olds & Lowe, P.C.

(57) ABSTRACT

A charging port cover and/or a fuel cap module for a motor vehicle for receiving or attaching at least one interface, which is used for charging and/or refueling a motor vehicle-side energy accumulator. The charging port cover and/or the fuel cap module also serves to fasten and mount at least one device having light sources. The at least one device illuminates both the charging port cover and/or the fuel cap module and a current charge level and/or a current fuel level of the motor vehicle-side energy accumulator. The charging port cover and/or the fuel cap module has a first opening and a second opening adjacent thereto. The first opening and the second opening are oriented such that emitted or deliverable light of the mounted at least one device can emerge from the first opening in a direction of an operator of the motor vehicle and from the second opening in a direction of the at least one interface for charging and/or refueling the motor vehicle-side energy accumulator.

13 Claims, 8 Drawing Sheets

(51) Int. Cl.
*H02J 7/00* (2006.01)
*B60Q 1/26* (2006.01)
*B60K 15/05* (2006.01)
*B60L 58/12* (2019.01)
*F21V 8/00* (2006.01)

(52) U.S. Cl.
CPC .......... *B60Q 1/2696* (2013.01); *G02B 6/0001* (2013.01); *H01R 13/7175* (2013.01); *H02J 7/0047* (2013.01); *H01R 2201/26* (2013.01); *H02J 7/0048* (2020.01)

(58) Field of Classification Search
CPC ............. H02J 2007/005; G02B 6/0001; B60Q 1/2696; B60Q 1/2261; B60K 15/05
USPC .......................................................... 320/109
See application file for complete search history.

(56) References Cited

U.S. PATENT DOCUMENTS

| | | | | |
|---|---|---|---|---|
| 8,134,334 B2* | 3/2012 | Suzuki et al. | ....... | B60Q 1/2661 320/107 |
| 8,317,376 B2* | 11/2012 | Hook et al. | ............. | B60Q 1/00 362/459 |
| 8,684,443 B2* | 4/2014 | Hara | ....................... | B60R 13/04 296/97.22 |
| 8,845,001 B2 | 9/2014 | Kotama et al. | | |
| 8,845,601 B2* | 9/2014 | Halaka et al. | ... | A61B 5/150129 604/291 |
| 8,937,538 B2 | 1/2015 | Yoshida | | |
| 9,197,072 B2 | 11/2015 | Umeda et al. | | |
| 10,525,875 B2 | 1/2020 | Kirilenko et al. | | |
| 2010/0246198 A1 | 9/2010 | Hook et al. | | |
| 2013/0134937 A1 | 5/2013 | Umeda et al. | | |
| 2013/0326955 A1 | 12/2013 | Kotama et al. | | |
| 2015/0102776 A1 | 4/2015 | Said | | |

FOREIGN PATENT DOCUMENTS

| | | |
|---|---|---|
| DE | 102011006481 A1 | 10/2012 |
| DE | 102012004874 A1 | 9/2013 |
| DE | 112012002323 T5 | 2/2014 |
| DE | 102012211048 A1 | 4/2014 |
| DE | 102014100640 A1 | 7/2015 |
| DE | 102016000311 A1 | 9/2016 |
| DE | 102017003868 A1 | 11/2017 |
| DE | 102017006157 A1 | 11/2017 |
| EP | 1103794 A2 | 5/2001 |
| JP | 2010006114 A | 1/2010 |
| JP | 2012226873 A | 11/2012 |
| JP | 2013115886 A | 6/2013 |
| JP | WO2012049733 A1 | 2/2014 |
| KR | 20160086363 A | 7/2016 |
| WO | WO2014001471 A2 | 1/2014 |

* cited by examiner

CHARGING PORT COVER AND/OR FUEL CAP MODULE FOR A MOTOR VEHICLE

This nonprovisional application claims priority under 35 U.S.C. § 119(a) to German Patent Application No. 10 2018 209 848.4, which was filed in Germany on Jun. 19, 2018, and which is herein incorporated by reference.

BACKGROUND OF THE INVENTION

Field of the Invention

The present invention relates to a charging port cover and/or fuel cap module for a motor vehicle. The invention also relates to a device for illuminating the charging port cover and/or fuel cap module.

Description of the Background Art

A charging port cover and/or fuel cap module and such a device are known from DE 10 2011 114 075 A1. Specifically, in this document, among other things an instrument cluster arranged in a tank inlet is described, which is arranged in a ring around a tank opening. In the instrument cluster, a ring-shaped light source for illuminating the tank inlet is combined with a display for displaying the fuel level. The display has several light emitting diodes (LEDs) also annularly arranged around the tank opening.

The disadvantage of this solution is that there is the possibility of blinding the operator by the light source illuminating the fuel inlet that is annularly arranged around the tank opening. In addition, the instrument cluster takes up a lot of space.

DE 10 2012 211 048 A1, which corresponds to US 2015/0102776 describes a charging device for charging a charge accumulator of an electrically powered motor vehicle. The charging device has a coupling device for inserting a charging plug. For illuminating the coupling device, this is surrounded by a light guide with a c-shaped contour, into which c-leg light from light sources is coupled on the front side. In the direction of the operator, the light guide is covered, so that the coupling device is illuminated indirectly by light coupled out of the light guide. The light guide acts both as a courtesy light and as an indicator light for the respective display of the charge level of the charge accumulator. This solution for lighting the coupling device is also very space-consuming.

Finally, DE 10 2011 108 817 A1 discloses a charging device for an electric vehicle in which segmental bulbs are strung together around the charging outlet to form a closed ring around the charging outlet. On the one hand, the bulbs are used to illuminate the charging outlet, on the other hand, they offer a kind of scale which can serve to display the charge level of the battery of the electric vehicle.

Due to the large-area and direct radiation of the light for illuminating the charging outlet, however, there is also the possibility of blinding the operator. The lighting also requires a lot of space and many bulbs.

SUMMARY OF THE INVENTION

It is therefore an object of the present invention to provide a charging port cover and/or fuel cap module, which can be illuminated efficiently and cost effectively and which can also provide information on the charge level and/or fuel level of the energy accumulator of the motor vehicle.

Furthermore, the invention is also based on the object to provide a suitable device for illuminating such a charging port cover and/or fuel cap module.

Initially proposed is a charging port cover and/or fuel cap module for a motor vehicle, which is designed for receiving or attaching at least one interface for charging and/or refueling an energy accumulator on the motor vehicle. The charging port cover and/or fuel cap module is also designed to attach at least one light emitting device, which serves both to illuminate the charging port cover and/or fuel cap module and to display the current charge level and/or fuel level of the motor vehicle-side energy accumulator.

If the vehicle is a conventional fuel-powered motor vehicle, the interface is formed as a filler neck (closable fuel tank opening). If it is an electrically powered motor vehicle, the interface is designed as a charging outlet.

However, it is also quite conceivable for the charging port cover and/or fuel cap module to have multiple interfaces. This can be the case, for example, if the motor vehicle is a hybrid vehicle. In such a case, it is conceivable that the charging port cover and/or fuel cap module serves for receiving or attaching a conventional fuel tank opening and at the same time also serves as a charging outlet. The presence of two differently designed charging outlets or fuel tank openings is also possible.

Usually, a charging port cover and/or fuel cap module is located on one side of the motor vehicle, preferably in the area of the rear wheels. Deviating from this, the charging port cover and/or fuel cap module can of course also be arranged at other locations of the motor vehicle, for example in the front or in the rear area of the motor vehicle.

The invention now proposes that the charging port cover and/or fuel cap module has at least one first opening and a second opening adjacent thereto. The openings serve to at least partially accommodate the device, which serves both to illuminate the charging port cover and/or fuel cap module as well as to display the current charge level and/or fuel level. The openings are aligned such that for charging and/or refueling the energy accumulator, emitted or deliverable light of the mounted device can exit from the first opening in the direction of the operator and from the second opening in the direction of the interface.

In this way, the foundation is laid for very effective illumination of the interface for charging and/or refueling the energy accumulator. Furthermore, this solution also leads to a very compact arrangement, although a double function is ensured: on the one hand the formation of a courtesy light for the interface and on the other hand, the optical display of information on the charge level and/or fuel level of the energy accumulator.

The first opening and the second opening have surface extensions which can be at a right angle to each other. This helps ensure said double function in a simple and compact manner.

It is very useful if, the first opening is located in a first plane and another opening for receiving or attaching the at least one interface is in a second plane. The planes are facing each other at an angle. This helps ensure effective illumination of the interface by the device. The angle that the two planes occupy together is preferably an obtuse angle. It is preferably between about 120° and 170°, more preferably between about 130° and 160°.

Conveniently, the device for illuminating the charging port cover and/or fuel cap module and for displaying the current charge level and/or fuel level is formed by a housing which is detachably connected to the charging port cover and/or fuel cap module. As a result, the maintenance of the charging port cover and/or fuel cap module is facilitated, and the cost of repair can be reduced. The housing may be preferably screwed or latched to the charging port cover and/or fuel cap module. This allows for a very simple replacement of the housing in case of failure.

The charging port cover and/or fuel cap module may be formed by a two-part component. In this case, the openings for the device are formed in a hard component of the two-part component and at least one further opening for receiving or attaching the at least one interface is formed in a soft component of the two-part component.

In this way, on the one hand, the device ensures that the lighting and display are solidly aligned, on the other hand, compensating movements of the interface in a fueling and/or charging process are possible in this way.

As mentioned earlier, the aim of the invention is to place a device under protection. The device is a device for illuminating a charging port cover and/or fuel cap module. The device also serves to display the current charge level and/or fuel level of an energy accumulator of a motor vehicle that is rechargeable and/or refuellable by means of the charging port cover and/or fuel cap module.

With regard to the device, the invention proposes that this is formed by a housing in which at least two light sources are accommodated. Generated or producible light by at least one light source exits at a first light-transmitting light exit region from the housing. Generated or producible light of at least one other light source exits at a second light-transmitting light exit region from the housing. In this case, the first light exit region allows the light to exit in a different direction than the second light exit region.

This way, the device provides the grounds for said device to realize the aforementioned dual function when installed in the charging port cover and/or fuel cap module.

The device can further be developed in that the surface area of the first light exit region is perpendicular to a surface area of the second light exit region. In this way, the dual function is further facilitated, and a compact design of the housing is provided.

In order to reduce the design effort for the device, it is proposed that the light emerging from the housing via the second light exit region is guided through a light guide from the light source to the light exit region. In particular, this makes it possible to use only one circuit board for receiving the at least two bulbs, while sufficient distance between the light source and the light exit region for purposes of homogeneous light emission can be obtained to display the charge level and/or fuel level. Particularly preferably, the light guide deflects light coupled into it by 90 degrees. Thus, the device is optimally adapted to the orientation of the light exit openings of the charging port cover and/or fuel cap module.

Customer demand for brand-specific customization of their vehicles is high. This need can be accommodated if the first light exit region is coated with an opaque layer and the layer is partially removed in such a way that thereby a symbol is formed. The symbol may be, for example, a brand-specific logo. When light is emitted through the light sources of the device, the logo appears clearly visible to the operator during a refueling or charging process.

To ensure easy replacement of the housing, it is proposed that fasteners for releasable attachment to the charging port cover and/or fuel cap module are available. The fastener may be formed, for example, as screw holes or a lock. In return, the charging port cover and/or fuel cap module can be equipped with appropriate screw domes or a counter-lock.

For an easy and uncomplicated electrical connection of the device to the electrical system of a motor vehicle, the housing preferably has at least one plug connection for connection to a plug connector. Due to the plug connection, on the one hand the electric power for operating the light sources and on the other hand, the signal flow to a sensor or a power management device may be provided, whereby the charge level or fuel level of a vehicle-side energy accumulator is detected or monitored.

Also, the invention aims to protect a motor vehicle which has at least one inventive charging port cover and/or fuel cap module.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
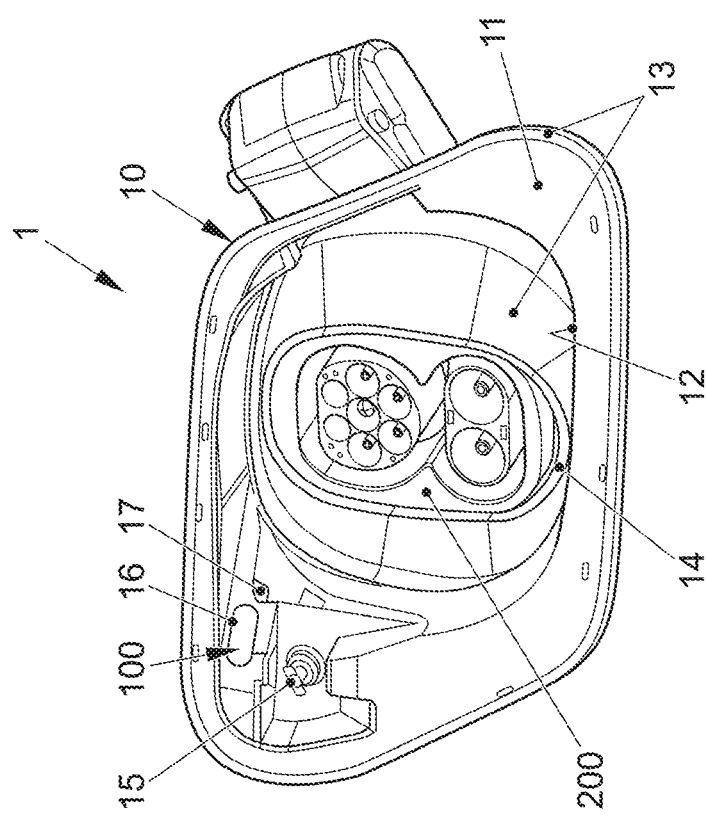
FIG. 1 is a perspective view of a charging port cover module for an electrically powered motor vehicle.

FIG. 1 shows a charging port cover module 1 for an electrically powered motor vehicle. The charging port cover module 1 includes for the most part of a trough-like or basin-like two-part component 10 which has a hard component 11 and a soft component 13 connected thereto. The hard component 11 may for example is formed of a hard plastic, preferably polypropylene (PP). For the soft component 13, a rubber-like plastic, for example a thermoplastic elastomer (TPE) may preferably be used.

In the soft component 13, a central opening 14 is formed. This opening 14 is used to release a vehicle-side interface 200 placed at the rear side of the soft component 13 for charging an energy accumulator of a motor vehicle. In the exemplary embodiment, the interface 200 is designed as a charging outlet.

Differing from the exemplary embodiment, depending on the design of the motor vehicle, it is also conceivable that the interface 200 is formed as a filler neck. Combinations of differently designed interfaces are also conceivable.

The charging port cover module 1 has an electrically activatable locking element 15 for locking a protective cap, which covers the charging port cover module 1.

Above the locking element 15 in the edge region of the two-part component 10, an elongate opening 16 is formed in the hard component 11. Immediately adjacent to the opening 16, there is a second opening 17 in the hard component 11.

The openings 16 and 17 are used to partially receive a device 100, which will be described later in more detail.

The device 100 serves on the one hand to illuminate the interface 200, on the other hand it serves to display the charge level for the operator.

From the figure it can be seen that the hard component 11 is formed like a frame and stabilizes the soft component 13 in the edge region. By means of a large opening 12, the hard component 11 releases a large part of the soft component 13 and its opening 14 together with the interface 200 which is in abutment with the opening 14.

Figure 2:
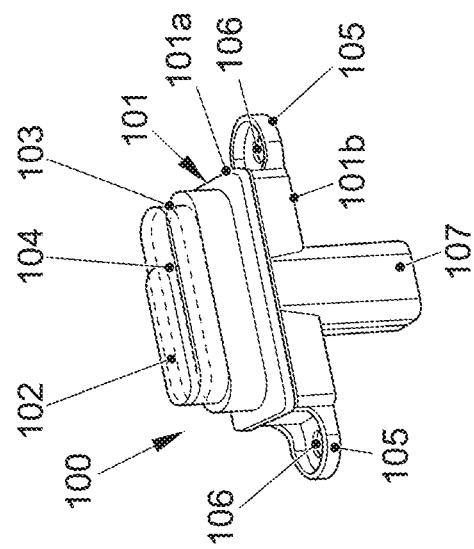
FIG. 2 is a perspective view of a device for illuminating the charging cover port module and for displaying the current charge level.

FIG. 2 shows the device 100 in isolation. The latter has a housing 101 with an upper part 101a and a lower part 101b. The upper part 101a may be clipped or glued to the lower part 101b.

The upper part 101a has an oblong light exit region 102 which is oval-shaped in outline. In the assembly position of the device 100, the light exit region 102 fills said opening 16 in the hard component 11 (see also FIG. 1). Thus, generated light can escape in the direction of the operator. The light exit region 102 serves as a charge level indicator.

The light exit region 102 merges via a shoulder 104 into a light exit region 103, which is aligned approximately perpendicular to the light exit region 102. This will be described later in more detail.

The lower part 101b of the housing 101 is equipped with a fastener 105 for the releasable attachment of the device 100 to the hard component 11 of the charging port cover module 1.

As can be seen, the device 100 has an elongate shape in outline, the opposite ends of which are formed by the fastener 105. The fastener 105 has openings 106 which serve for the passage of fixing screws, by means of which the device 100 may be secured on fixing domes (not visible) of the hard component 11.

Lastly, the lower part 101b merges into a plug connection 107. The plug connection 107 is used to plug in a motor vehicle-side plug connector and thus to ensure a power supply and suitable signal transmission.

Figure 3:
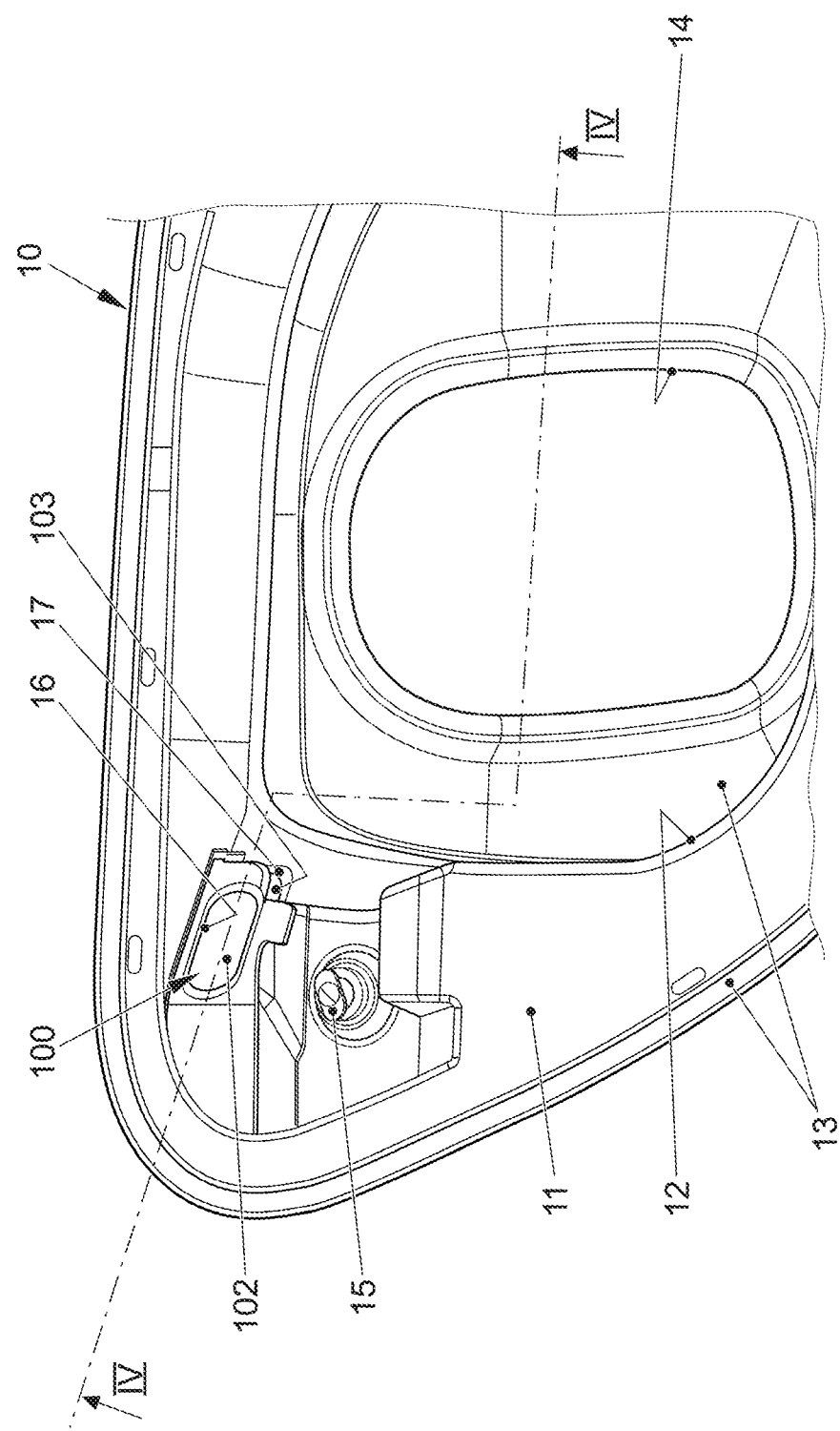
FIG. 3 is an enlarged partial view of the charging port cover module.

FIG. 3 illustrates the somewhat enlarged the two-part component 10 in the region of the openings 16 and 17. This particularly clearly shows how the device 100 partially protrudes into the openings 16 and 17 in the assembled state. This way, the charge level can be indicated very effectively and in a compact manner by means of the opening 16. By means of the opening 17, direct illumination in the direction of the opening 14 or in the direction of the interface 200 can be ensured.

The openings 16 and 17 are inclined to the opening 14. In this way, illumination in the region of the opening 14 can be optimized.

Figure 4:
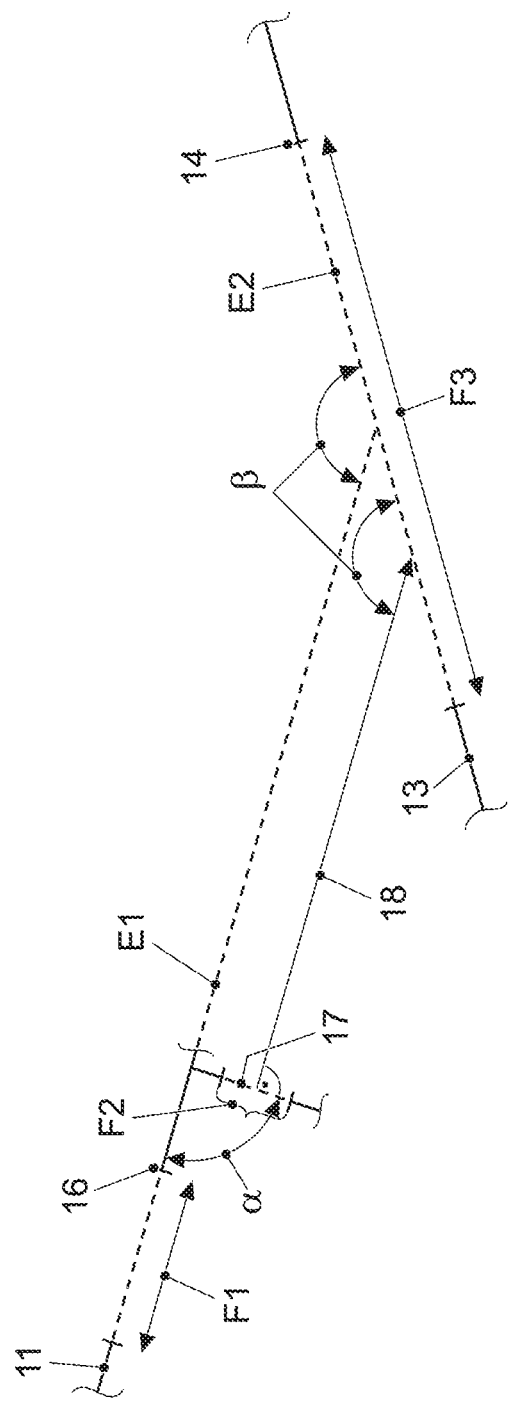
FIG. 4 is a schematic sectional view according to section line IV of FIG. 3.

This can be seen particularly well in FIG. 4, which schematically represents the advantageous geometric design:

It can be seen that the opening 16 in the hard component 11 has a surface extension F1 which falls in a first plane E1. The second opening 17 has a surface extension F2, which is at an angle α of about 90 degrees to the plane E1, that is aligned approximately perpendicular thereto.

The opening 14 formed in the soft component 13 has a surface extension F3 which lies in a plane E2. The planes E1 and E2 are directed towards each other at an angle β, wherein the angle β is preferably an obtuse angle. Preferably, the angle β is between about 120° and 170°, more preferably between about 130° and 160°.

In other words, the planes E1 and E2 are oriented such that a surface normal 18 perpendicular to the surface extension F2 of the opening 17 is also at an angle β to the plane E2 or to the surface extension F3 of the opening 14.

Figure 5:
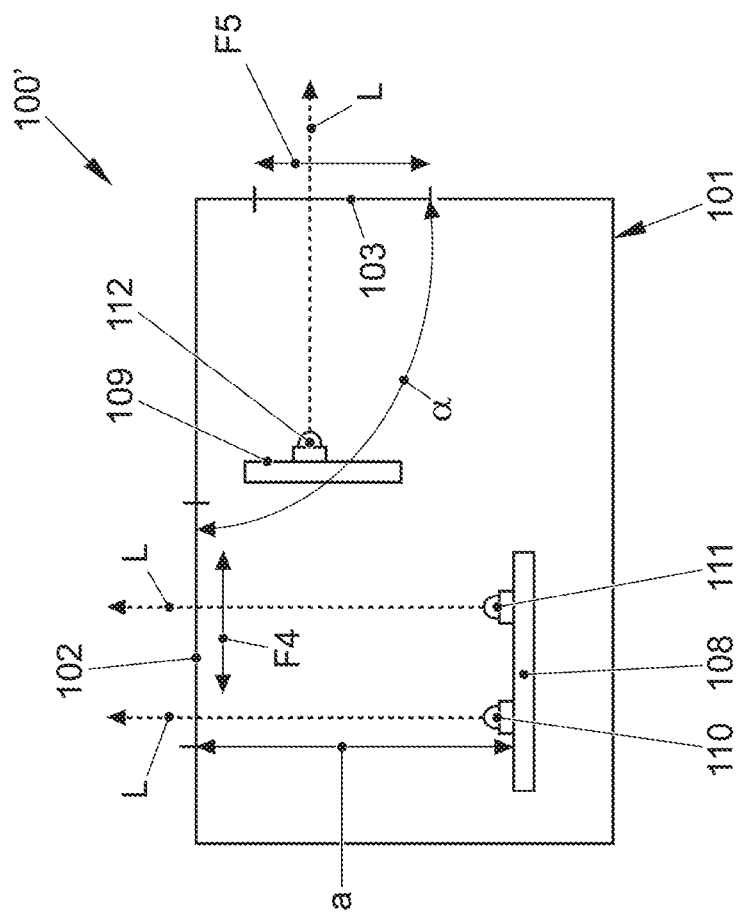
FIG. 5 is a schematic representation of the arrangement of bulbs in the housing of the lighting device.

With reference to FIG. 5, an embodiment of a device 100' is outlined, which represents a possible arrangement of light sources in the housing 101 of the device 100'.

It can be seen that in the housing 101, a first circuit board 108 with two bulbs 110 and 111 is received. A second board 109 is aligned perpendicular to the board 108 and holds a further bulb 112. The bulbs 110 to 112 are preferably designed as light emitting diodes, particularly preferably as RGB light emitting diodes. Depending on the control, these can emit light in any color.

The housing 101 of the device 100' also has a first transparent light exit region 102 with a surface extension F4, and a second transparent light exit region 103 with a surface extension F5. The surface extensions F4 and F5 are preferably aligned at a right angle α to one another.

The light of the bulbs 110 and 111 emerges outward at the light exit region 102; the light of the bulbs 112 at the light exit region 103.

Despite emitting light in two different directions, the illustrated division into two boards 108 and 109 allows for maintaining a certain distance a of the board 108 to the light exit region 102. Such distance is required in order to avoid so-called hotspots (punctiform light appearances) for the operator and to allow for a homogeneous light appearance for the charge level indicator. This is not necessary for the light L of the bulb 112 since this light serves merely as courtesy lighting for the interface 200 and the light exit region 103 is not directly visible in the mounting position of the device 100' due to the operator.

Figure 6:
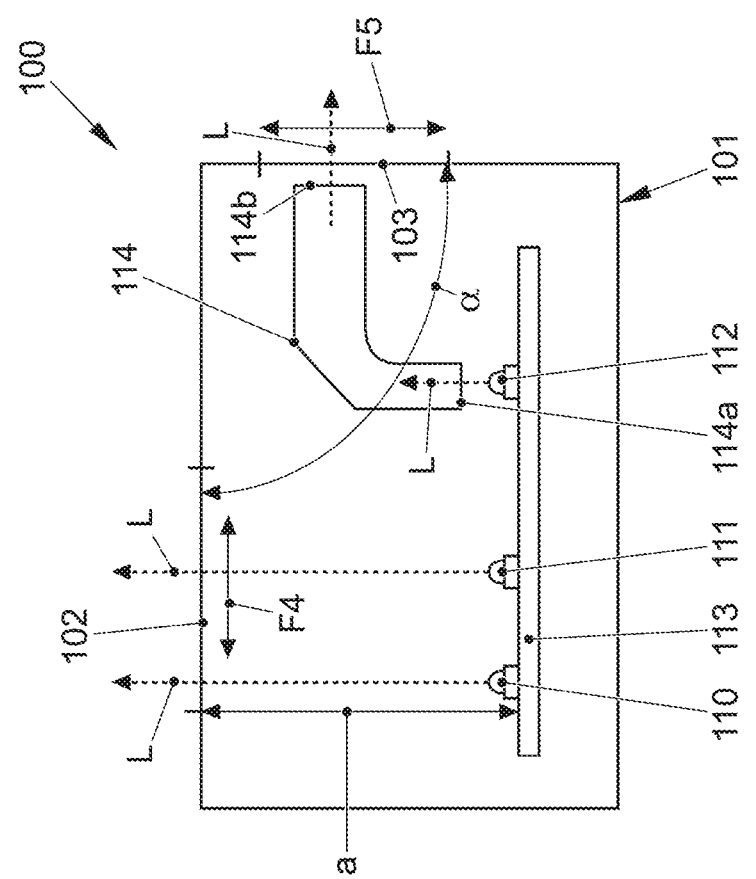
FIG. 6 is a schematic representation of the arrangement of bulbs in the housing of the lighting device.

FIG. 6 shows a comparable basic illustration for the preferred device 100. In this solution, a light guide 114 is used. This way, all three bulbs 110, 111 and 112 can be arranged on a single circuit board 113. This contributes to a compact and simple construction of the device 100.

Also, in this preferred solution, the surface extensions F4 and F5 of the light exit regions 102 and 103 are aligned at a right angle α to one another.

The light L of the bulbs 110 and 111 exits the light exit region 102 after optional collection via an optical element. The light L of the bulb 112, however, enters the light guide 114 on a frontal light input surface 114a, is deflected therein in a direction of about 90 degrees and again exits from the light guide 114 at an equally frontal light exit point 114b and finally from the light exit region 103.

Figure 7:
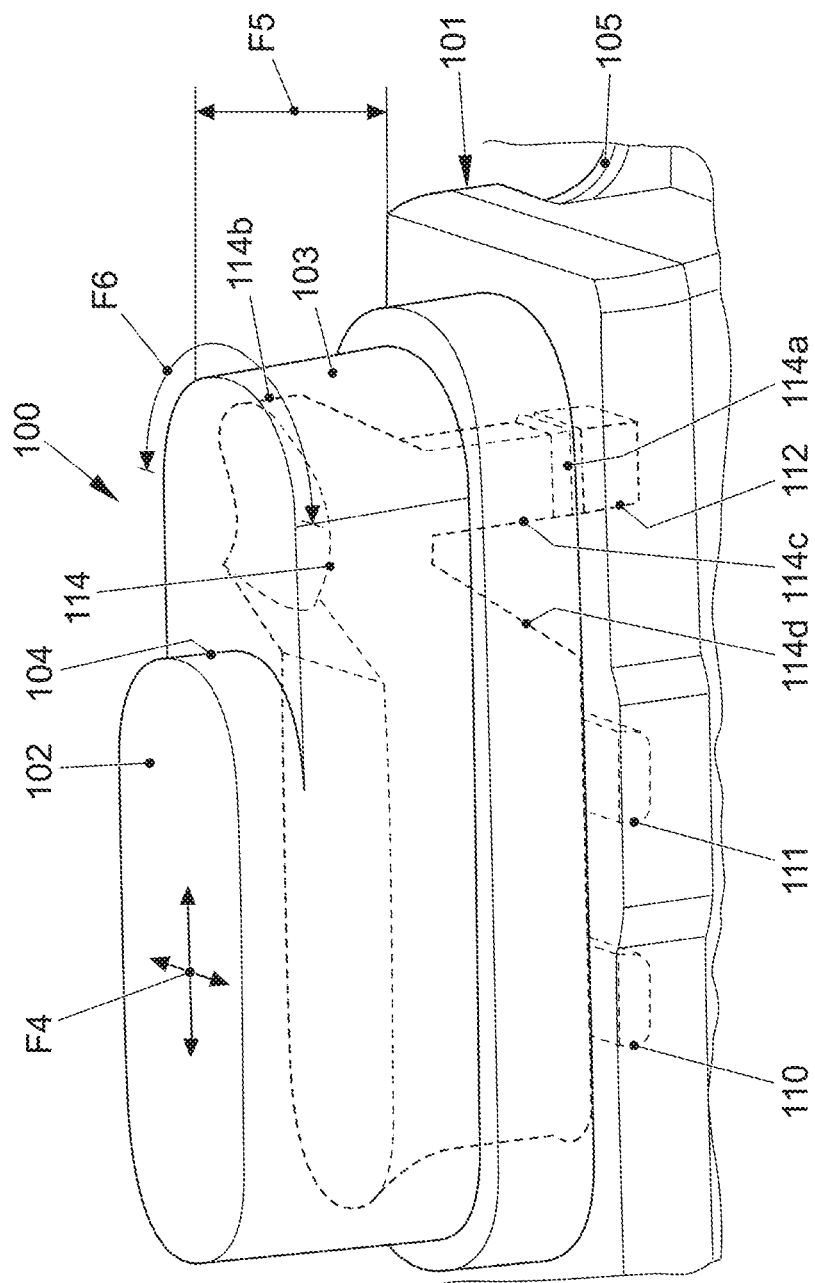
FIG. 7 is a detailed representation of a part of the housing of the lighting device.

FIG. 7 now describes the device 100 in more detail.

It can be seen that the light guide 114 is shaped approximately like a women's shoe, with a heel-like part 114c and a front part 114d.

The part 114c embodies the actual light guide from the light input surface 114a up to the light output surface 114b for the light emitted by the bulb 112. It is clear from this illustration that the light exit region 103 is of semicircular design in outline (as seen from above), with the surface extension F5 which is vertical in the figure, and a horizontal semicircular surface extension F6.

By contrast, the already mentioned, front part 114d of the light guide 114 serves only to "catch" the light emitted by the bulbs 110 and 111. The light is substantially passed straight through part 114d in the direction of the light exit region 102.

Figure 8:
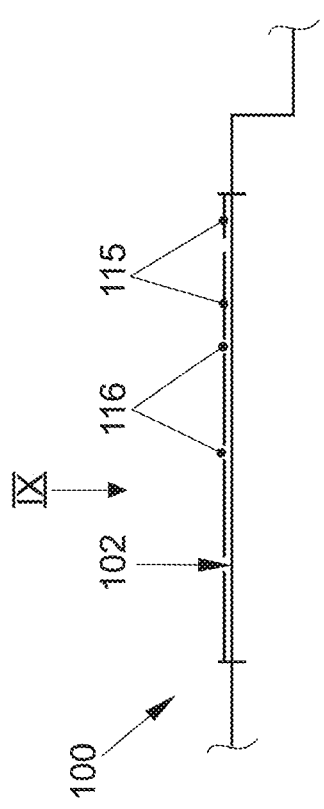
FIG. 8 illustrates a representation of a light exit region of the housing.
Figure 9:
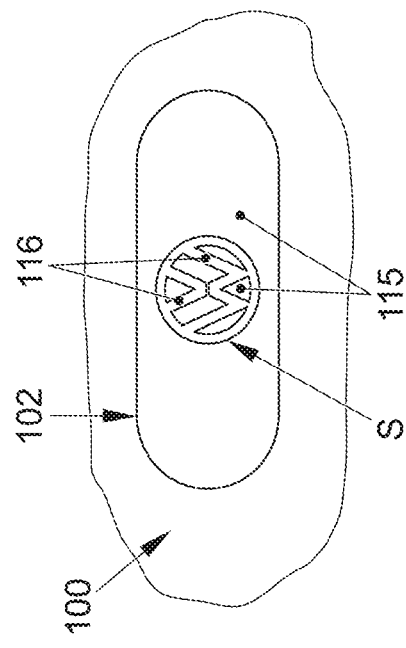
FIG. 9 illustrates a representation of the light exit region according to view IX of FIG. 8.

FIGS. 8 and 9 demonstrate that the light exit region 102 of the device 100 can be provided with an opaque layer 115. Light permeable areas 116 are formed in the layer 115 such that a symbol S is formed in a plan view of the light exit region 102.

The symbol S is preferably a trademark symbol and provides brand-specific customization of the charging port cover module 1 for the operator.

Figure 10:
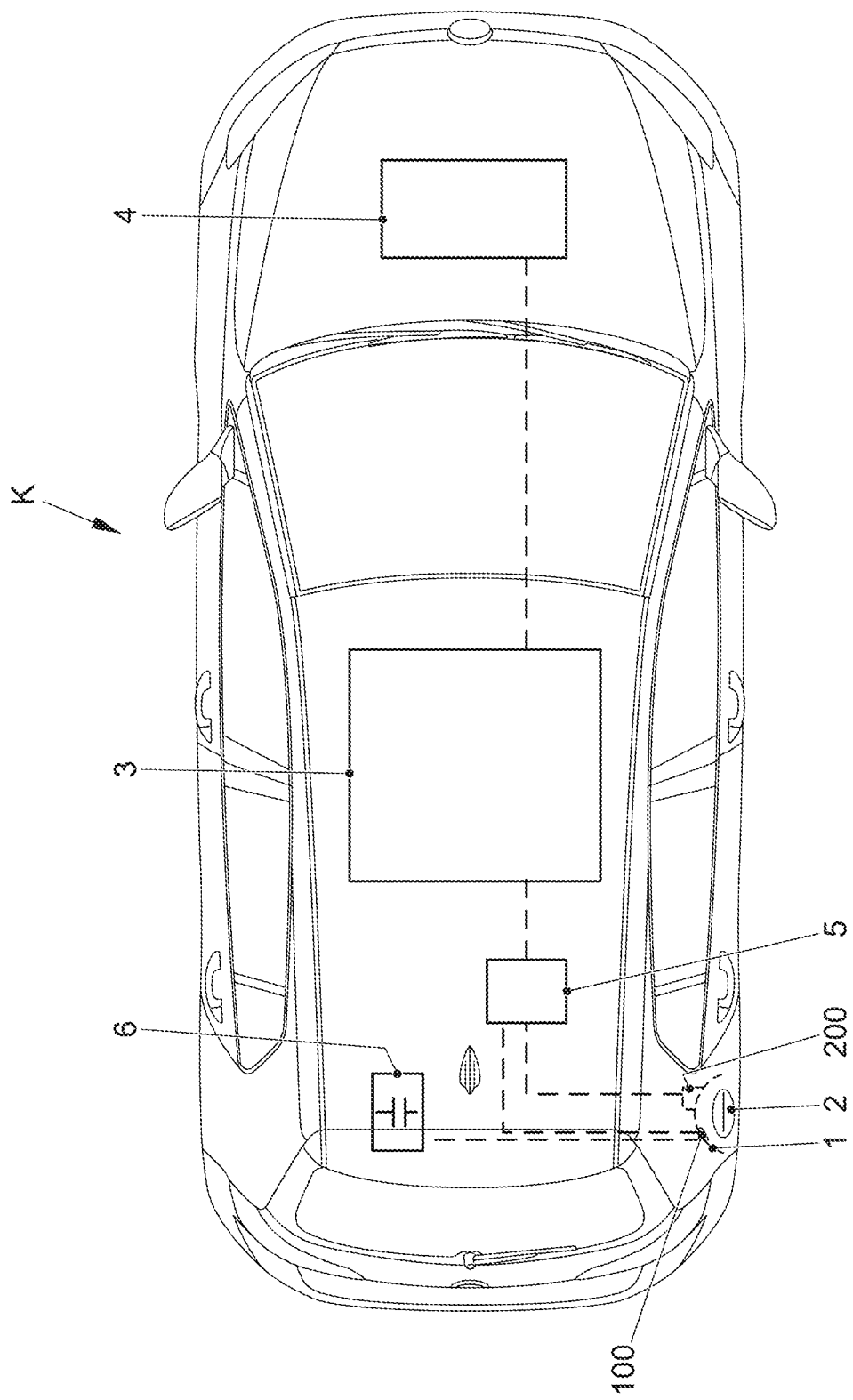
FIG. 10 illustrates a representation of an electrically powered vehicle with a charging port cover module according to the invention from above.

Finally, FIG. 10 shows an electrically powered motor vehicle K, which is equipped with a charging port cover module 1 according to the invention.

The charging port cover module 1 is covered or coverable by a protective cap 2.

By means of the charging port cover module 1, a motor vehicle-side energy accumulator in the form of a traction battery can be charged by plugging in a charging plug. The electrical energy of the energy accumulator 3 is used to supply an electrically powered motor 4 with electrical energy.

The charging port cover module 1 or the device 100 is (as is the interface 200) electrically or signal-technically connected to an energy management device 5. The energy management device 5 ensures correct energy management when charging the energy accumulator 3, for example, the level of the charging current. Furthermore, the energy management device 5 serves to control the device 100 as a function of the current charge level of the energy accumulator 3. The device 100 is electrically connected to an onboard battery 6.

By way of example, the charging process can proceed as follows:

After unlocking the motor vehicle K and opening the protective cap 2, the bulbs 110 to 112 of the device 100 are initially powered in such a way that they emit white light, in particular white continuous light. In this way, an optimal courtesy light for the interface 200 is provided through the opening 17. The operator can thus quickly locate the interface 200 and insert a charging plug into the interface 200.

After plugging in the charging plug and starting the charging process, the color of the light L emitted by the bulbs 110 to 112 changes (see, for example, FIG. 7) to the color green. In addition, the light L is emitted in a flashing manner in order to clearly show the operator that the charging state has begun or is ongoing.

When the energy management device 5 determines that the energy accumulator 3 is fully charged, then the device 100 is activated such that the bulbs 110 to 112 display a continuous green light.

If an error occurs during the charging process, then the device 100 is activated in such a way that the bulbs 110 to 112 emit a steady or flashing red light.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A charging port cover and/or a fuel cap module for a motor vehicle adapted to receive or attach at least one interface for charging and/or refueling a motor vehicle-side energy accumulator, and for fastening and mounting at least one device having light sources which are used both for an illumination of the charging port cover and/or the fuel cap module and to display a current charge level and/or a current fuel level of the motor vehicle-side energy accumulator, the charging port cover and/or the fuel cap module comprising:
   a first opening; and
   a second opening adjacent to the first opening, wherein the first opening and the second opening are adapted to at least partially receive the at least one device and are oriented in a way such that an emitted light or a deliverable light of the mounted at least one device emerges from the first opening in a direction of an operator of the motor vehicle and from the second opening in a direction of the at least one interface for charging and/or refueling the motor vehicle-side energy accumulator.

2. The charging port cover and/or the fuel cap module according to claim 1, wherein the first opening and the second opening have plane extensions that are at or about a right angle to each other.

3. The charging port cover and/or the fuel cap module according to claim 2, wherein the first opening is in a first plane and a further opening for receiving or attaching the at least one interface is in a second plane, wherein the first plane and the second plane face each other at an angle.

4. The charging port cover and/or the fuel cap module according to claim 1, wherein the at least one device is formed by a housing, which is releasably connected to the charging port cover and/or the fuel cap module.

5. The charging port cover and/or the fuel cap module according to claim 1, wherein the charging port cover is formed by a two-part component, wherein the first opening and the second opening for the at least one device are formed in a hard component and at least one further opening for receiving or attaching the at least one interface is formed in a soft component of the two-part component.

6. A device for illuminating a charging port cover and/or a fuel cap module according to claim 1 and for displaying a current charge level and/or a current fuel level of an energy accumulator, which is rechargeable and/or refuellable via the charging port cover and/or the fuel cap module, wherein the device is formed by a housing in which at least two light sources are accommodated, wherein a generated light or a deliverable light of at least one light source exits at a first light permeable exit region, and a generated light or a deliverable light of at least one other light source exits at a second light permeable exit region from the housing, and wherein the first light permeable exit region allows the generated light or the deliverable light to escape in a different direction than the second light permeable exit region.

7. The device according to claim 6, wherein the first light permeable exit region with a surface extension is substantially perpendicular to a surface extension of the second light permeable exit region.

8. The device according to claim 6, wherein the generated light or the deliverable light emerging from the housing via the second light permeable exit region is guided via a light guide from the at least one other light source to the second light permeable exit region.

9. The device according to claim 8, wherein the light guide deflects input light by 90°.

10. The device according to claim 6, wherein the first light permeable exit region is coated with an opaque layer, and wherein the opaque layer is partially removed thereby a symbol is formed.

11. The device according to claim 6, wherein the housing has a fastener to releasably attach to the charging port cover and/or the fuel cap module.

12. The device according to claim 6, wherein the housing has at least one plug connection for connection with a plug connector.

13. A motor vehicle comprising at least one of the charging port cover and/or the fuel cap module according to claim 1.

* * * * *